United States Patent [19]

Swanson

[11] 4,455,241

[45] Jun. 19, 1984

[54] WELLBORE FLUID

[75] Inventor: Billy L. Swanson, Bartlesville, Okla.

[73] Assignee: Phillips Petroleum Company, Bartlesville, Okla.

[21] Appl. No.: 349,277

[22] Filed: Feb. 16, 1982

[51] Int. Cl.$^3$ .......................... E21B 21/04; C09K 7/04
[52] U.S. Cl. .......................... 252/8.55 R; 252/8.5 C; 252/8.5 A
[58] Field of Search ............ 252/8.5 A, 8.5 C, 8.55 R

[56] References Cited

U.S. PATENT DOCUMENTS

| | | | |
|---|---|---|---|
| 2,525,783 | 10/1950 | Farrow et al. | 252/8.5 |
| 2,571,093 | 10/1951 | Temple | 252/8.5 |
| 2,793,187 | 5/1957 | Fischer | 252/8.5 M |
| 2,957,822 | 10/1960 | Frint | 252/8.5 |
| 3,084,121 | 4/1963 | Wisner | 52/8.5 |
| 3,753,903 | 8/1973 | Fischer et al. | 252/8.5 A |
| 3,882,029 | 5/1975 | Fischer et al. | 252/8.55 R |
| 3,989,630 | 11/1976 | Walker | 252/8.5 A |
| 4,012,328 | 3/1977 | Hunter | 252/8.55 R |
| 4,012,329 | 3/1977 | Hayes et al. | 252/8.5 P |
| 4,140,639 | 2/1979 | Jackson | 252/8.5 A |
| 4,175,042 | 11/1979 | Mondshine | 252/8.55 R |
| 4,247,402 | 1/1981 | Hartfiel | 252/8.5 A |
| 4,255,268 | 3/1981 | Block | 252/8.5 B |
| 4,257,903 | 3/1981 | Kucera | 252/8.5 C |
| 4,378,049 | 3/1983 | Hsu et al. | 252/8.5 LC |

FOREIGN PATENT DOCUMENTS 0655812  1/1963  Canada ........................ 252/8.55 R

*Primary Examiner*—Christine M. Nucker

[57] ABSTRACT

The water loss properties of well completion and well workover fluids are improved by the addition of an effective amount of at least one adjuvant selected from (1) sodium carbonate with either sodium bicarbonate or an organic polycarboxylic acid or polycarboxylic acid anhydride or (2) sodium bicarbonate alone. In another embodiment, the adjuvants are added to stabilize water loss control agents in wellbore fluids, especially at elevated temperatures.

20 Claims, No Drawings

WELLBORE FLUID

BACKGROUND OF THE INVENTION

This invention relates to the drilling and servicing of wells and more particularly to aqueous well completion and workover fluids for use in drilling wells into permeable fluid producing formations and for servicing wells drilled into such formations. In accordance with another aspect, this invention is concerned with the addition of adjuvants to stabilize water loss control agents in wellbore workover fluids, especially at elevated temperatures.

In the servicing of wells drilled into subterranean formations, clear water and various brines and viscous aqueous solutions have been proposed as well completion and workover fluids. These fluids generally do not possess the requisite properties of density, viscosity, gel strength, stability and low fluid loss desired for these applications. Hence, need exists for a non-damaging well completion workover fluid having the requisite properties for use in completing wells and drilling through permeable strata and in conducting workover and similar operations in such wells but which will not result in any substantial permanent damage to the permeable strata which it contacts.

Accordingly, it is an object of this invention to provide an improved well completion and workover fluid. Another object of this invention is to provide a substantially clay-free well completion and workover fluid.

Another object of this invention is to provide well completion and workover fluids which exhibit low fluid loss properties.

Another object of this invention is to provide well completion and workover fluids which exhibit adequate particle carrying capacity as reflected in desirable gel strengths, especially after thermal aging.

Other objects, aspects, as well as the several advantages of the invention will be apparent upon reading the specification and the appended claims.

In accordance with the invention, the water loss property of a clay-free wellbore workover fluid is improved by the addition of an adjuvant selected from (a) sodium bicarbonate ($NaHCO_3$) (b) sodium bicarbonate ($NaHCO_3$)+sodium carbonate ($Na_2CO_3$) and (c) sodium carbonate+an organic polycarboxylic acid or polycarboxylic acid anhydride.

In accordance with a specific embodiment of the invention, the water-loss property of a clay-free wellbore workover fluid comprising water, an electrolyte such as sodium chloride, an acid-soluble weighting agent such as calcium carbonate, a suspending agent such as asbestos, a polymeric viscosifier such as carboxymethyl cellulose and alkaline reagent such as $Na_2CO_3$, is improved by the addition of $NaHCO_3$ or selected organic carboxylic acids and optionally by the addition of $NaHCO_3$ alone in the absence of $Na_2CO_3$.

The use of sodium bicarbonate adjuvant alone in the inventive compositions is effective at a concentration of at least 10 lbs/bbl of total composition. In compositions for high temperature water loss control with both sodium carbonate and sodium bicarbonate as stabilizing adjuvants, the weight percent of sodium carbonate varies from 65 to 15 whereas the weight percent of sodium bicarbonate varies from 35 to 85 based on the combined weight of $Na_2CO_3$ and $NaHCO_3$ in the inventive composition. The total weight of $Na_2CO_3$ and $NaHCO_3$ in lb/bbl varies over the range of 8 to 20 preferably over the range of 10 to 17. It is contemplated that the adjuvants enhance the water loss control performance, e.g., of carboxymethyl cellulose (CMC) by thermal stabilization of said CMC.

In a further embodiment of the invention, organic polycarboxylic acids are used in combination with sodium carbonate to improve the performance of water loss agents in workover fluids. The polycarboxylic acids can range in the number of carbon atoms from 2 to at least about 76 carbon atoms. Representative examples of suitable polycarboxylic acids that can be used include tartaric acid, citric acid, oxalic acid, tannic acid, adipic acid, phthalic acid, and/or phthalic anhydride and the like and mixtures thereof. The total weight of $Na_2CO_3$ and organic polycarboxylic acid in lb/bbl varies over the range of 5 to 10 preferably 6 to 9 with the proviso that the weight ratio of $Na_2CO_3$:polycarboxylic acid varies over the range of 20:1 to 5:1. Presumably, suitable anhydrides of polycarboxylic acids are hydrolyzed in the alkaline environment to polycarboxylic acids.

The electrolyte can be water soluble inorganic salts such as halide and nitrate salts of sodium and potassium together with ammonium salts including sodium chloride, potassium chloride, sodium bromide, potassium bromide, sodium nitrate, ammonium nitrate, ammonium chloride, ammonium bromide and the like and mixtures thereof. Saturated sodium chloride solution is presently preferred as the base fluid in the inventive compositions which exhibit densities in the range of 13.5 to 15 lb/gal after the addition of selected acid-soluble weighting agents. Sea water can be used for the preparation of workover fluids with densities in the range of 11–12 lb/gal. Thus the instant invention is applicable to improving the water loss properties of workover fluids having densities in the range of about 11 to about 15 lb/gal.

Weighting agents which are completely acid-soluble, such as $CaCO_3$, $BaCO_3$ and iron carbonate, are preferred in the inventive compositions to give densities in the above cited range. These additives are completely acid-soluble and can be dissolved and back-flushed with acid from subterranean formations to prevent formation damage or plugging. Presumably such undesirable formation damage can occur with workover operations using fluids comprising nonacid-soluble weighting agents such as barium sulfate. Ideally, a workover fluid should contain no solids, however, the addition of insoluble weighting agents is frequently necessary to raise fluid density to the desired level. Ferric and ferrous oxides can also be used as weighting agents in the inventive compositions. Ferrous oxide is preferred over ferric oxide because of the former's greater solubility in 15 percent HCl which is the fluid frequently used to correct formation damage.

Suitable viscosity characteristics can be imparted to the inventive compositions by the use of natural polymer viscosity additives such as guar gum, cellulose ethers, polysaccharides, and the like, and mixtures thereof. With these viscosity additives the carrying capacity of the fluid will vary in the agitated and non-agitated states, thus, for example, in a non-agitated separating tank, the accumulated fluid loses its carrying capacity and sand, debris and the like drop out whereas the agitated fluid has sufficient carrying capacity to carry cuttings and the like to the surface should the fluids be used for such purposes. These viscosity-increasing additives also exhibit effectiveness as water-loss agents in general, however, in the present compositions the overall water-loss control property of the viscosity additives is greatly improved by the addition of $NaHCO_3$ alone or $Na_2CO_3$ and $NaHCO_3$.

The cellulose ethers which can be used include, among others: the various carboxy alkyl cellulose ethers such as carboxyethyl cellulose and carboxymethyl cellulose (CMC); mixed ethers such as carboxyalkyl hydroxyalkyl ethers such as carboxymethyl hydroxyethyl cellulose (CMHEC); hydroxyalkyl celluloses such as hydroxyethyl cellulose and hydroxy propyl cellulose; alkyl hydroxyalkyl celluloses such as methyl hydroxy propyl cellulose; alkyl celluloses such as methyl cellulose, ethyl cellulose and propyl cellulose; alkyl carboxy alkyl celluloses such as ethyl carboxy methyl cellulose; alkyl alkyl celluloses such as methylethyl cellulose; and the like. Many of the cellulose ethers are available commercially in various grades. The carboxy-substituted ethers are available as the alkaline metal salt, usually the sodium salt. However, the metal is seldom referred to and they are commonly referred to as CMC for carboxy methyl cellulose and CMHEC for carboxymethylhydroxyethyl cellulose, etc. A presently preferred cellulose ether is CMC. Water-dispersible CMC is available in various degrees of carboxylate substitutions ranging from about 0.3 up to the maximum degree of substition of 3.0. In general, CMC having a degree of substitution in the range of 0.65 to 1.3 is preferred. CMC having a degree of substitution in the range of 0.85 to 1.2 is a more preferred cellulose ether. CMC having a degree of substitution less than the above-preferred ranges is generally less uniform in properties and thus less desirable. CMC having a degree of substitution greater than the above preferred ranges usually has a lower viscosity and more is required in preparing suitable compositions. The degree of substitution of CMC is commonly designated in practice as CMC-7, CMC-9, CMC-12, etc., where the 7, 9, and 12 refer to a degree of substitution of 0.7, 0.9 and 1.2, respectively.

Another suitable polymeric viscosifier that can be used according to the invention is guar gum. Guar gum is a free-flowing nonionic, water soluble polymer. Guaran, the scientific name for guar gum, is a straight-chain mannan with single-membered galactose branches composed of about 80% D-galacto-D-mannoglycan, 5% proteins, 2% crude fibers, and 1% ash. The ratio of D-galactose to D-mannose in guaran is 35:65. The D-mannopyranose units are joined by (1→4) links, and single D-galactopyranose units are joined to this chain by a (1→6) links. On the average, the galactose branches occur in every other mannose unit. A commercially available guar gum identified as Guar THI sold by Hercules Incorporated is presently preferred.

Suitable polysaccharides include the ionic heteropolysaccharides produced by fermentation of carbohydrates by bacteria of the genus Xanthomonas. Exemplary of such heteropolysaccharides are those produced by Xanthomonas campestris, Xanthomonas begonia, Xanthomonas phaseoli, Xanthomonas hederae, Xanthomonas incanae, Xanthonomas carotae, and Xanthomonas translucens. Of these, ionic polysaccharide B-1459 is preferred. This polysaccharide is prepared by culturing the bacterium Xanthomonas campestris NRRL B-1459, United States Department of Agriculture, on a well-aerated medium containing commercial glucose, organic nitrogen sources, dipotassium hydrogen phosphate, and various trace elements. Fermentation is carried out to completion in 4 days or less at a pH of about 7 and a temperature of 28° C. Polysaccharide B-1459 is commercially available under the trade name of "Kelzan" from the Kelco Company, San Diego, Calif.

The amount of polymeric viscosifier used in the practice of the invention can vary widely depending upon the viscosity grade and purity of the polymer, and properties desired in compositions of the invention. In general, the amount of polymeric viscosifier used will be a water thickening amount, i.e., at least an amount which will significantly thicken the water to which it is added. In general, amounts in the range of about 0.25 lb/bbl to about 3 lb/bbl can be advantageously employed and with preferred amounts based primarily upon economics ranging from about 0.75 lb/bbl to about 2 lb/bbl.

Asbestos is used as a suspending agent for the weighting material in the inventive compositions. In this role asbestos is relatively inexpensive and the desirable flow characteristics (rheological properties) of the fluid systems are maintained. Of the various types of asbestos which are commercially available the asbestos derived from chrysotile is presently preferred. The chrysotile asbestos fibers provide maximum carrying or suspending properties with a minimum of asbestos. The following examples further demonstrate the operability of the instant compositions.

The completion and workover fluid compositions of this invention are prepared by admixing the desired proportion of the various ingredients with water. All of the ingredients are fairly readily dissolved or dispersed in water by circulation through the conventional mixing equipment of a rotary drilling rig.

Experimental

Each workover fluid was made in 243 mL saturated NaCl by adding Flosal ® (asbestos), polymeric viscosifier such as carboxymethyl cellulose and 295 g $CaCO_3$. The sodium carbonate, sodium bicarbonate and any other components were usually added along with the calcium carbonate. After adding the Flosal, the mixture was stirred for 10 minutes with a Multimixer before sifting in the polymeric viscosifier. After all the polymer had been added, the mixtures were stirred for 20 minutes before finally adding the calcium carbonate and other components with stirring. The total mixture was stirred for about two minutes, poured into brass bombs and purged with nitrogen before sealing and aging at 300 F. After aging at 300 F., properties such as room temperature water loss were measured by conventional techniques. The results which substantiate the effectiveness of the inventive adjuvants to improve the performance of water-loss control agents in workover fluids aged at 300 F. are tabulated hereinbelow. Table I summarizes the results with $Na_2CO_3$ adjuvant or $NaHCO_3$ adjuvant; Table II summarizes the results with mixtures of $Na_2CO_3$ and $NaHCO_3$ whereas Table III summarizes the results with $Na_2CO_3$ adjuvant and representative organic carboxylic acid adjuvants.

TABLE I

Compositions[a] Containing $Na_2CO_3$ or $NaHCO_3$

| Run No. | Total lbs/bbl ($Na_2CO_3$) | Total lbs/bbl ($NaHCO_3$) | Wt. % of each additive (% $Na_2CO_3$) | Wt. % of each additive (% $NaHCO_3$) | Aging Time at 300° F. (Days) | SS# | Water Loss (mL/30 min.) |
|---|---|---|---|---|---|---|---|
| 1 | 5 | 0 | 100 | 0 | 2/3 | 300 | 20 |
| 2 | 5 | 0 | 100 | 0 | 3 | 360 | 39 |
| 3 | 10 | 0 | 100 | 0 | 7 | 1500 | 73 |
| 4 | 0 | 10 | 0 | 100 | 2/3 | 30 | 4.6 |
| 5 | 0 | 10 | 0 | 100 | 3 | 30 | 3.4 |
| 6 | 0 | 10 | 0 | 100 | 7 | 40 | 5.3 |

[a]These compositions contained saturated NaCl water with 295 lb/bbl $CaCO_3$, 2 lb/bbl Flosal[R] fiber and 2 lb/bbl carboxymethyl cellulose with a DS of 1.2.
SS represents shear strengths expressed in lb/100 sq. ft.

The inventive runs of Table I (Run Nos. 4, 5, 6) demonstrate the effectiveness of $NaHCO_3$ in enhancing the effectiveness of carboxymethyl cellulose (CMC) as a water loss additive for systems aged ⅔, 3, or 7 days at 300° F. Run 3 shows the ineffectiveness of $Na_2CO_3$ relative to $NaHCO_3$ in promoting water loss control by said CMC at the 10 lb/bbl level in the subject workover fluids for the 7-day aging period at 300° F. The shear strengths in the inventive compositions (runs 4, 5, 6) remain desirably low to moderate thus maintaining said compositions in a readily pumpable state.

TABLE II

Compositions Containing CMC, $Na_2CO_3$ and $NaHCO_3$

| Run No. | Total lbs/bbl ($Na_2CO_3$) ($NaHCO_3$) | Wt. % of Each Additive* (% $Na_2CO_3$) | Wt. % of Each Additive* (% $NaHCO_3$) | Aging Time a 300 F (Days) | Water Loss (mL/30 min.) |
|---|---|---|---|---|---|
| 7 | 5 + 1 | 83.3 | 16.7 | 2/3 | 9 |
| 8 | 5 + 1 | 83.3 | 16.7 | 3 | 23 |
| 9 | 5 + 2 | 71.4 | 28.6 | 2/3 | 5.1 |
| 10 | 5 + 2 | 71.4 | 28.6 | 6 | 53 |
| 11 | 5 + 3 | 62.5 | 37.5 | 2/3 | 5.4 |
| 12 | 5 + 3 | 62.5 | 37.5 | 6 | 54 |
| 13 | 5 + 4 | 55.5 | 44.5 | 2/3 | 2.7 |
| 14 | 5 + 4 | 55.5 | 44.5 | 7 | 6.9 |
| 15 | 5 + 5 | 50 | 50 | 2/3 | 2.4 |
| 16 | 5 + 5 | 50 | 50 | 7 | 8.4 |
| 17 | 10 + 10 | 50 | 50 | 7 | 3.2 |
| 18 | 5 + 6 | 45.5 | 54.5 | 7 | 4.6 |
| 19 | 5 + 10 | 33.33 | 66.66 | 7 | 4.2 |
| 20 | 10 + 4 | 71.4 | 28.6 | 7 | 41.5 |
| 21 | 10 + 6 | 62.5 | 37.5 | 7 | 2.8 |
| 22 | 10 + 6 | 62.5 | 37.5 | 7 | 7.4 |

*Based on combined weight of carbonate and bicarbonate. These were prepared with saturated NaCl solution as used in Example I.

The inventive runs in Table II (Run Nos. 14, 16, 17, 18, 19, 21, 22) show that the water loss property is approximately 10 mL/30 min. or less for systems aged for 7 days at 300° F. and containing at least about 9 lbs/bbl of sodium carbonate and sodium bicarbonate wherein the % carbonate in the additive package is within 30 to 65 weight percent (ca. ⅓ to ⅔ of the additive package) and the % bicarbonate is the balance, i.e., ⅔ to ⅓ of the additive package.

Run pairs 7 and 8; 9 and 10; and 11 and 12, show, respectively, that lower loadings of total carbonate and bicarbonate at 6 lb/bbl, 7 lb/bbl and 8 lbs/bbl are insufficient to enhance the effectiveness of CMC for water-loss control in systems aged at 300° F. for 3 days or 6 days. However, runs 7, 9, and 11 do show that the said lower loadings of total carbonate and bicarbonate promote good water loss control by CMC in systems aged at 300° F. for only ⅔ of a day.

TABLE III

Compositions Containing CMC, $Na_2CO_3$ and Organic Carboxylic Acids

| Run No. | Total lbs/bbl ($Na_2CO_3$) (Organic Acid) | Wt. % of Each Additive* (% $Na_2CO_3$) | Wt. % of Each Additive* (% Organic Acid) | Aging Time @ 300 F (Days) | Water Loss (mL/30 min.) |
|---|---|---|---|---|---|
| 23 | 5 + 0 | 100 | 0 | 2/3 | 20 |
| 24 | 5 + 0.25[a] | 95.2 | 4.8 | 2/3 | 11.0 |
| 25 | 5 + 1.0[a] | 83.3 | 16.7 | 2/3 | 5.6 |
| 26 | 5 + 0.25[b] | 95.2 | 4.8 | 2/3 | 11.0 |
| 27 | 5 + 0.5[b] | 90.9 | 9.1 | 2/3 | 8.0 |
| 28 | 5 + 1.0[b] | 83.3 | 16.7 | 2/3 | 4.4 |
| 29 | 5 + 0.25[c] | 95.2 | 4.8 | 2/3 | 9.4 |
| 30 | 5 + 0.5[c] | 90.9 | 9.1 | 2/3 | 7.9 |
| 31 | 5 + 1.0[c] | 83.3 | 16.7 | 2/3 | 6.8 |
| 32 | 5 + 0.25[d] | 95.2 | 4.8 | 2/3 | 11.3 |
| 33 | 5 + 0.5[d] | 90.9 | 9.1 | 2/3 | 8.9 |
| 34 | 5 + 1.0[d] | 83.3 | 16.7 | 2/3 | 6.2 |
| 35 | 5 + 1.0[e] | 83.3 | 16.7 | 2/3 | 7.5 |

TABLE III-continued

Compositions Containing CMC, $Na_2CO_3$ and Organic Carboxylic Acids

| Run No. | Total lbs/bbl ($Na_2CO_3$) (Organic Acid) | Wt. % of Each Additive* (% $Na_2CO_3$) | (% Organic Acid) | Aging Time @ 300 F (Days) | Water Loss (mL/30 min.) |
|---|---|---|---|---|---|
| 36 | 5 + 1.0[f] | 83.3 | 16.7 | 2/3 | 7.6 |

*Based on combined weight of carbonate and organic acid.
[a]Tartaric Acid
[b]Citric Acid
[c]Adipic Acid
[d]Phthalic Anhydride is presumably at least partially hydrolyzed to phthalic acid salts.
[e]Oxalic Acid
[f]Tannic Acid The results in Table III were all carried out at 5 lb/bbl of $Na_2CO_3$ with the indicated amounts of carboxylic acids. Water loss values in the systems summarized in Table III were satisfactory but the systems were aged at 300° F. for only ⅔ of a day (16 hours). Run 23 which contained only $Na_2CO_3$ at the 5 lb/bbl level exhibited poor water loss control (20 mL/30 min.) by CMC compared to the runs of Table III containing both $Na_2CO_3$ and carboxylic acids.

Saturated sodium chloride solution is preferred for fluids of higher densities such as those in the 13 to 15 lb/gal range. Less solid acid-soluble weighting agent would be necessary because of the relatively higher density of the saturated sodium chloride solution. For the preparation of workover fluids with densities in the range of 11 to 12 lb/gal sea water can be used. Results from representative systems are summarized in Table IV. These fluids with densities of 11.5 lb/bbl were prepared with 280 mL synthetic sea water, 2 g of polymeric viscosifier (2 lb/bbl), 2 g asbestos (Flosal at 2 lb/bbl) and 194 g $CaCO_3$ (295 lb/bbl).

The inventive runs of Table IV (Run Nos. 43, 47, 48, 49, 51–58) show the effectiveness of $NaHCO_3$ in combination with $Na_2CO_3$ to improve the performance of carboxymethyl cellulose as a water loss control agent in workover fluids aged for seven days at 300 F. In these runs, the total weight of $Na_2CO_3$ and $NaHCO_3$ in lb/bbl varies over the approximate range of 8 to 20 preferably over the range of 10 to 17.

TABLE IV

Workover Fluids Prepared With Sea Water

| Run No. | Total lb/bbl ($Na_2CO_3$) ($NaHCO_3$) | Wt. % of Each Additive* (% $Na_2CO_3$) | (% $NaHCO_3$) | Aging Time @ 300° F. (Days) | Water Loss (mL/30 min.) |
|---|---|---|---|---|---|
| 37 | 3 + 1 | 75 | 25 | 7 | 315.0 |
| 38 | 5 + 1 | 83.3 | 16.7 | 7 | 15.4 |
| 39 | 7 + 1 | 87.5 | 12.5 | 7 | 333.0 |
| 40 | 10 + 1 | 90.9 | 9.1 | 7 | 44.0 |
| 41 | 2 + 2 | 50 | 50 | 7 | 420.0 |
| 42 | 3 + 3 | 50 | 50 | 7 | 20.0 |
| 43 | 5 + 3 | 62.5 | 37.5 | 7 | 9.4 |
| 44 | 7 + 3 | 70 | 30 | 7 | 17.6 |
| 45 | 10 + 3 | 77 | 23 | 7 | 47.0 |
| 46 | 2 + 5 | 28.6 | 71.4 | 7 | 23.0 |
| 47 | 3 + 5 | 37.5 | 62.5 | 7 | 9.4 |
| 48 | 5 + 5 | 50 | 50 | 7 | 8.4 |
| 49 | 7 + 5 | 58.4 | 41.6 | 7 | 11.0 |
| 50 | 10 + 5 | 66.66 | 33.33 | 7 | 35.0 |
| 51 | 2 + 7 | 22.2 | 77.8 | 7 | 9.2 |
| 52 | 3 + 7 | 30 | 70 | 7 | 7.6 |
| 53 | 5 + 7 | 41.6 | 58.4 | 7 | 7.0 |
| 54 | 7 + 7 | 50 | 50 | 7 | 7.6 |
| 55 | 2 + 10 | 16.6 | 83.4 | 7 | 8.2 |
| 56 | 3 + 10 | 23 | 77 | 7 | 7.0 |
| 57 | 5 + 10 | 33.33 | 66.66 | 7 | 7.0 |
| 58 | 7 + 10 | 41.1 | 58.9 | 7 | 7.0 |

Referring again to said inventive runs of Table IV, it can be seen that for enhancing the effectiveness of CMC in high temperature water loss control, the weight percent of sodium carbonate varies from 65 to 15 whereas the weight percent of sodium bicarbonate varies from 35 to 85 based on the combined weight of $Na_2CO_3$ and $NaHCO_3$ in the inventive compositions. The poor water loss control in run No. 41 shows that the reduced 4 lb/bbl loading of $Na_2CO_3$ and $NaHCO_3$ adjuvants is too low.

Deficiency in yield point values after thermal aging with the inventive systems comprising carboxymethylhydroxyethyl cellulose prompted the additional work described hereinbelow summarized in Table V. Having already established the effective ranges hereinabove for the sodium carbonate and/or sodium bicarbonate adjuvants to control water loss, carboxymethylhydroxyethyl cellulose polymers were studied to find systems with adequate water loss control as well as retention of flow properties after thermal aging. Compositions were formulated in saturated salt water muds weighted to 13.7 lb/gal with $CaCO_3$. Representative results are summarized in Table V. Unless otherwise noted, all muds were prepared by adding 2 g polymer to 243 mL saturated salt water followed by 295 g $CaCO_3$, 3 g $Na_2CO_3$ and 7 g $NaHCO_3$ to make one laboratory bbl equivalent.

TABLE V
Compositions Containing CMHEC, Na₂CO₃ and NaHCO₃

| Run No. | Composition | $Av^i$ Initial | $Av^i$ After Aging* | $PV/YP^i$ Initial | $PV/YP^i$ After Aging | $Gels^i$ Initial | $Gels^i$ After Aging | Water Loss (mL/30 min) Initial | Water Loss (mL/30 min) After Aging |
|---|---|---|---|---|---|---|---|---|---|
| 59 | CMHEC$^a$ | 48.5 | 42 | 40/17 | 33/18 | 4/7 | 5/7 | 6.0 | 6.2 |
| 60 | CMHEC$^b$ | 46.5 | 49.5 | 35/23 | 33/33 | 6/10 | 7/8 | 9.8 | 11.1 |
| 61 | CMC$^c$ | 75 | 27.5 | 66/18 | 26/3 | 2/3 | 4/5 | 6.4 | 5.0 |
| 62 | CMC$^d$ | 73 | 26.5 | 67/12 | 30/−7 | 0/0 | 0/1 | 6.6 | 5.6 |
| 63 | CMHEC$^e$ | NR# | NR# | 48/16 | 56/45 | 12/12 | 12/13 | 10.5 | 13.6 |
| 64 | CMHEC$^e$ | NR# | NR# | 53/33 | 56/63 | 9/13 | 12/12 | 3.6 | 12.0 |
| 65 | CMHEC$^e$ | NR# | NR# | 63/33 | 43/26 | 7/9 | 6/6 | 19.3 | 5.2 |
| 66 | CMHEC$^e$ | NR# | NR# | 40/15 | 34/29 | 6/8 | 6/8 | 14.4 | 5.0 |
| 67 | CMHEC$^f$ | NR# | NR# | 64/29 | 43/29 | 9/11 | 9/11 | 7.2 | 4.4 |
| 68 | CMHEC$^g$ | NR# | NR# | 19/12 | 19/6 | 4/6 | 2/3 | 9.5 | 23.6 |
| 69 | CMHEC$^g$ | NR# | NR# | 22/10 | 32/17 | 4/7 | 5/8 | 8.6 | 30.4 |
| 70 | CMHEC$^h$ | NR# | NR# | 59/25 | 81/60 | 11/14 | 14/16 | 9.1 | 14.2 |

*In runs 59-66, thermal aging was carried out at 300 F for seven days. In runs 67-70, thermal aging was carried out at 300 F for three days.
$^a$A carboxymethylhydroxyethyl cellulose with a DS of 0.3 and MS of 0.7 (see footnote e for definitions of DS and MS) was used.
$^b$The polymer of run 59 was used with 10 lb/bbl NaHCO₃
$^c$The polymer was carboxymethyl cellulose with DS of 0.9.
$^d$The polymer of run 61 was used with 10 lb/bbl NaHCO₃.
$^e$A carboxymethylhydroxyethyl cellulose with a DS of 0.4 (degree of substitution of carboxymethyl groups) and a MS of 2 (molar substitution of hydroxyethyl groups) was used. The average number of carboxymethyl groups (DS) per anhydroglucose unit in the cellulose backbone can be a maximum of three. MS designates the average number of alkylene oxide units per anhydroglucose unit in the cellulose backbone. Different lot number samples of CMHEC were used in runs 63-66 and 68-69.
$^f$A carboxymethylhydroxyethyl cellulose with a DS of 0.3 and MS of 0.7 was used.
$^g$A carboxymethylhydroxyethyl cellulose with a DS of 0.4 and MS of 0.3 was used.
$^h$A carboxymethylhydroxyethyl cellulose with a DS of 0.6 and MS of 0.6 was used.
$^i$AV represents apparent viscosity (centipoise); PV represents plastic viscosity (centipoise); YP represents yield point (lb/100 ft²); Gels represent gel strength (lb/100 ft²; 10 sec/10 min).
NR represents Not Recorded.

Referring to the runs in Table V, the water loss control values are adequate to excellent but yield points after thermal aging were deficient particularly in runs 61 and 62 formulated with carboxymethyl cellulose. Carboxymethylhydroxyethyl cellulose in runs 59 and 60 gave formulations with stable yield point values and adequate water loss control after aging at 300 F. for seven days. Gel strengths (related to the particle-carrying capacity of the fluid) were maintained in the carboxymethylhydroxyethyl cellulose systems in runs 59, 60 and 63-70 after thermal aging. Gel strength and yield point in run 62 (10 lb/bbl NaHCO₃ and no Na₂CO₃) were undesirably low after thermal aging but water loss control was good. In run 61, only the yield point was deficient after thermal aging. The results of Table V suggest that the best balance of properties can be obtained with various carboxymethylhydroxyethyl cellulose systems containing 3 lb/bbl Na₂CO₃ and 7 lb/bbl NaHCO₃.

I claim:

1. A method for producing wellbore fluids which comprises combining aqueous clay-free wellbore fluids having densities ranging from about 11 to about 15 lb/gal with a water-loss improving amount of an additive selected in the group consisting of
    (a) NaHCO₃
    (b) NaHCO₃ and Na₂CO₃ and
    (c) Na₂CO₃ and an organic polycarboxylic acid or polycarboxylic acid anhydride.

2. A method according to claim 1 wherein said additive is NaHCO₃ and said amount is at least about 10 lb/bbl of workover fluid.

3. A method according to claim 1 wherein said additive is NaHCO₃ and Na₂CO₃ and said amount ranges from about 8 to about 20 lb/bbl of fluid and the amount of Na₂CO₃ present in the ranges from about 65 to about 15 wt. % and the amount of NaHCO₃ ranges from about 35 to about 85 wt. % based on the combined weight of Na₂CO₃ and NaHCO₃.

4. A method according to claim 1 wherein said additive is (c) and said amount ranges from about 5 to about 10 lb/bbl and the weight ratio of Na₂CO₃ to said polycarboxylic acid ranges from about 20:1 to about 5:1.

5. A method according to claim 1 wherein said wellbore fluid contains a natural polymer viscosifier.

6. A method according to claim 5 wherein said viscosifier is selected from guar gum, cellulose ethers, and polysaccharides.

7. A method according to claim 5 wherein said viscosifier is present in amounts ranging from about 0.25 lb/bbl to about 3 lb/bbl fluid.

8. A wellbore composition comprising an aqueous clay-free wellbore fluid having a density ranging from about 11 to about 15 lb/gal fluid and a water loss stabilizing amount of an additive consisting essentially of
    (a) NaHCO₃
    (b) NaHCO₃ and Na₂CO₃ and
    (c) Na₂CO₃ and an organic polycarboxylic acid.

9. A composition according to claim 8 wherein said additive is (a) and said amount is at least about ten lb/bbl of workover fluid.

10. A composition according to claim 8 wherein said additive is (b) and said amount ranges from about 8 to about 20 lb/bbl of fluid and the amount of Na₂CO₃ present in the ranges from about 65 to about 15 wt. % and the amount of NaHCO₃ ranges from about 35 to about 85 wt. % based on the combined weight of Na₂CO₃ and NaHCO₃.

11. A composition according to claim 8 wherein said additive is (c) and said amount ranges from about 5 to about 10 lb/bbl and the weight ratio of Na₂CO₃ to said polycarboxylic acid ranges from about 20:1 to about 5:1.

12. A composition according to claim 8 wherein said wellbore fluid contains (1) an electrolyte selected from water soluble inorganic salts (2) an acid soluble weighting agent (3) a polymeric viscosity additive and (4) a suspending agent.

13. A composition according to claim 12 wherein (1) is NaCl (2) is $CaCO_3$ (3) is carboxymethyl cellulose or carboxymethylhydroxyethyl cellulose and (4) is asbestos.

14. A composition according to claim 11 wherein said polycarboxylic acid is tartaric acid, citric acid, oxalic acid, tannic acid, adipic acid, or phthalic anhydride.

15. A composition according to claim 8 wherein said wellbore fluid contains a natural polymer viscosifier.

16. A composition according to claim 15 wherein said viscosifier is selected from guar gum, cellulose ethers, and polysaccharides.

17. A composition according to claim 16 wherein said viscosifier is present in amounts ranging from about 0.25 lb/bbl to about 3 lb/bbl fluid.

18. A composition according to claim 8 wherein said wellbore fluid is a brine.

19. A composition according to claim 15 wherein said viscosifier is carboxymethyl cellulose or carboxymethylhydroxyethyl cellulose.

20. A composition according to claim 19 wherein said additive is $NaHCO_3$ and $Na_2CO_3$.

* * * * *